(12) United States Patent
Jensen

(10) Patent No.: US 6,529,053 B2
(45) Date of Patent: Mar. 4, 2003

(54) RESET CIRCUIT AND METHOD THEREFOR

(75) Inventor: Rune H. Jensen, San Francisco, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/826,570

(22) Filed: Apr. 5, 2001

(65) Prior Publication Data

US 2002/0145454 A1 Oct. 10, 2002

(51) Int. Cl.[7] .................................................. H03L 7/00
(52) U.S. Cl. ........................................ 327/142; 327/141
(58) Field of Search .................................. 327/142, 141, 327/198

(56) References Cited

U.S. PATENT DOCUMENTS

| | | | |
|---|---|---|---|
| 4,967,377 A | 10/1990 | Masuda | 364/518 |
| 5,371,417 A | * 12/1994 | Mirov et al. | 327/142 |
| 5,510,740 A | * 4/1996 | Farrell et al. | 327/142 |
| 5,576,650 A | * 11/1996 | Hirotani et al. | 327/142 |

FOREIGN PATENT DOCUMENTS

WO  PCT/DE87/00533  11/1987

OTHER PUBLICATIONS

IBM, *Multiple Card Interlocking—Power on Reset Control Circuit*, IBM Technical Disclosure Bulletin vol. 36, No. 12, Dec. 1993, pp. 533–534.

IBM, *Power–on–Reset Circuit Sensitive to Power Supply Level and Clock*, IBM Technical Disclosure Bulletin vol. 37, No. 02A, Feb. 1994, pp. 121–122.

* cited by examiner

*Primary Examiner*—Dinh T. Le
(74) *Attorney, Agent, or Firm*—Peter Zawilski

(57) ABSTRACT

The operability and scaleability of electronic circuits is improved using a circuit arrangement that is modular, scaleable, straightforward to implement and allows for simple and safe physical design implementation. According to one example embodiment of the present invention, a reset method and system are used to effect a reset at several peripheral devices that may employ similar and/or different reset strategies. A reset signal generator is coupled to a clock module having an external clock reference and to each of the peripheral devices. A reset clock signal having the reference clock frequency is sent to each of the peripheral devices via clock outputs at the clock module. A synchronization module at each of the peripheral devices is adapted to synchronize the reset signal among all peripheral devices using the clock signal. The clock module holds the reset clock signal for a selected amount of time, and then releases the signal from the external clock. The reset signals are then simultaneously released at each of the peripheral devices, making possible a smooth transition from reset.

20 Claims, 4 Drawing Sheets

RESET CIRCUIT AND METHOD THEREFOR

FIELD OF THE INVENTION

The present device relates generally to electronic systems and, more particularly, to electronic systems and components exhibiting non-analogous reset strategies.

BACKGROUND OF THE INVENTION

To contain and potentially shorten the design and development cycle time for large-scale systems, previously designed components, or modules, are commonly used. Such modules, having been designed for systems having differing reset requirements, often have differing clock and timing constraints. Some modules, for example, employ an asynchronous reset scheme, a synchronous reset scheme or a mix of both. Others employ a positive-edge-triggered clocking scheme, a negative-edge-triggered clocking scheme, a level sensitive scheme, a multi-phased scheme, and so on. In like manner, the convention used for resetting each module may differ. For each module, the reset strategy employed introduces timing constraints relative to the particular clocking scheme employed. Examples of such timing constraints include: a synchronous reset must arrive at the module for a specified duration before the active edge of the clock and/or be held at its active state for a specified duration after the clock edge; an asynchronous reset should not be released in close proximity to a change of clock state in a level sensitive clocking design; a reset signal should not be asserted, or de-asserted, in close proximity to an assertion or desertion of a set signal; the release of a reset signal is advantageously effected about simultaneously for all modules; and so on. From a systems viewpoint, the varying reset and clocking strategies produce a combinatorial complex set of design constraints.

To accommodate the varying clocking strategies among modules, conventional systems include a module-clock-generator that generates the various clocking signals, at appropriate frequency and phase relative to each other for proper system operation. Accommodation of the varying reset strategies is commonly somewhat less structured. Typically, because of the combinatorial nature of the problem, specific reset circuitry is designed for each modules, or for each set of modules having a similar combination of reset and clock configurations. While the design of each reset circuit may not be unduly burdensome, the system level design task of properly defining, configuring, and testing each of these circuits can be significant.

The use of specific, time-dependent, reset circuits also minimizes the likelihood that systems designed with such circuits with "scale" as technologies change, or as other features are added to the system. Similarly, the use of such a system as a future module in a larger system will only serve to exacerbate the problems associated with modules having differing reset strategies and timing constraints.

SUMMARY OF THE INVENTION

The present invention makes possible a reset circuit that is modular, scaleable, straightforward to implement, allows for simple and safe physical design implementation, and addresses problems stated in the Background hereinabove. The present invention is exemplified in a number of implementations and applications, some of which are summarized below.

According to an example embodiment of the present invention, a reset circuit is adapted to reset a plurality of circuit modules in a manner that addresses problems including those discussed in the Background hereinabove. The reset circuit includes a reset module adapted to generate a reset signal, a clock module and a plurality of synchronization modules. The clock module has an external clock reference and at least one clock module output for each of the plurality of circuit modules. A reset clock signal is provided to each of the circuit modules via the clock module outputs in response to the generated reset signal. The frequency of the clock module is selectable to an external clock reference. Each synchronization module is coupled to one of the plurality of circuit modules and has a reset input port coupled to the reset module and a clock input port coupled to one of the clock module outputs. The synchronization modules are adapted to synchronize the reset signal to the reset clock signal and to provide the synchronized reset signal to reset each circuit module. The circuit modules are adapted to enable internal resets in response to a reset signal.

In another example embodiment of the present invention, a plurality of circuit modules adapted to enable internal resets in response to a reset signal are reset using a method that addresses problems including those discussed in the Background hereinabove. A reset signal is generated, and a reset clock signal having a frequency of an external clock reference is sent to each circuit module in response to the generated reset signal. The reset signal is synchronized to the reset clock signal for each circuit module, and the synchronized reset signal is to reset each circuit module. When the reset is disabled, each circuit module releases its internal reset almost simultaneously.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
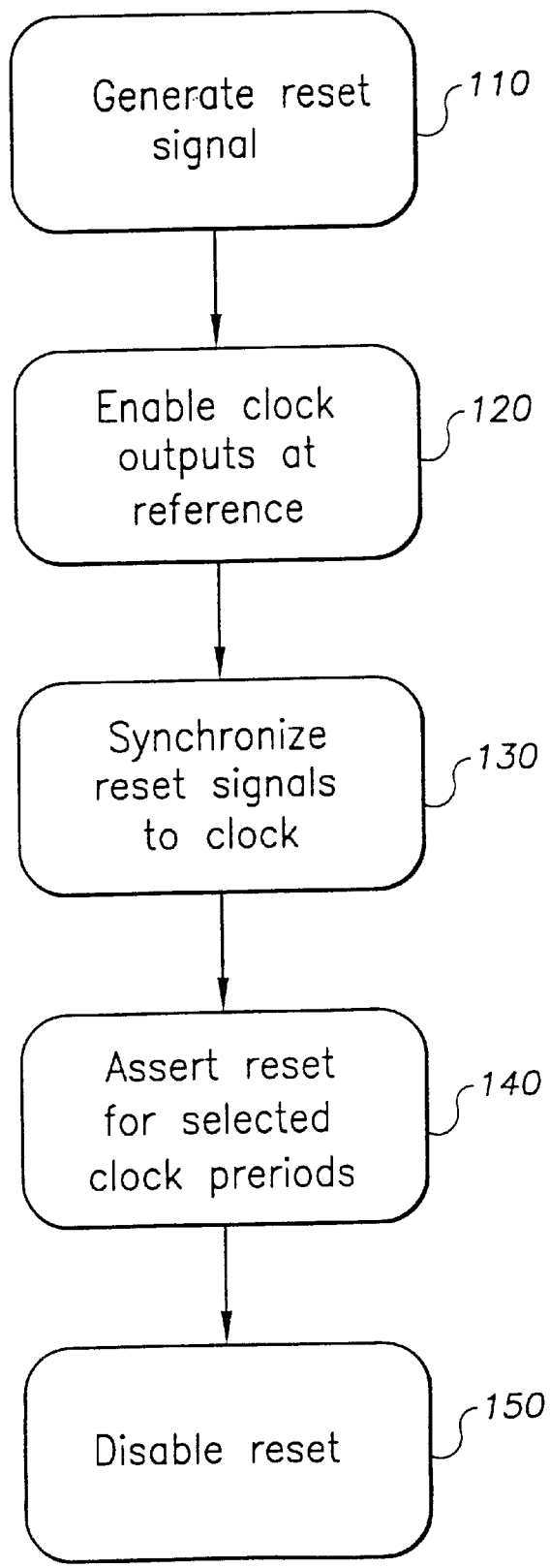
FIG. 1 is a flow diagram for a circuit reset, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of electronic devices, and has been found to be particularly suited for use in connection with devices exhibiting non-analogous reset strategies. While the present invention is not limited to such devices, an appreciation of various aspects of the invention is best gained through a discussion of various examples using this application.

According to an example embodiment of the present invention, a reset method and system are used to effect a reset at a plurality of circuit modules (e.g., peripheral devices). The system includes a reset signal generator coupled to a clock module and to each of the plurality of circuit modules. The clock module is coupled to an external clock reference and to each of the circuit modules via clock outputs for the circuit modules. A reset clock signal having the reference clock frequency is sent to each of the circuit modules via the clock outputs. Each of the circuit modules includes a synchronization module adapted to synchronize the reset signal among all circuit modules using the clock signal received from the clock module. The clock module holds the reset clock signal for a selected amount of time, and then releases the signal from the external clock. The reset signals are then simultaneously released at each of the circuit modules.

FIG. 1 is a flow diagram showing a method for resetting a circuit, according to another example embodiment of the present invention. At block 110, a reset signal is generated, and the signal is provided to a clock module and to two or more circuit modules. All clock outputs from the clock module are enabled at a reference clock frequency at block 120. At block 130, the clock outputs are received at each circuit module and used to synchronize the reset signal among the circuit modules. The reset is asserted for a selected number of clock periods at block 140, and the reset is disabled after the selected number of clock periods has been reached at block 150, effecting the simultaneous de-assertion of the reset at each circuit module.

Figure 2:
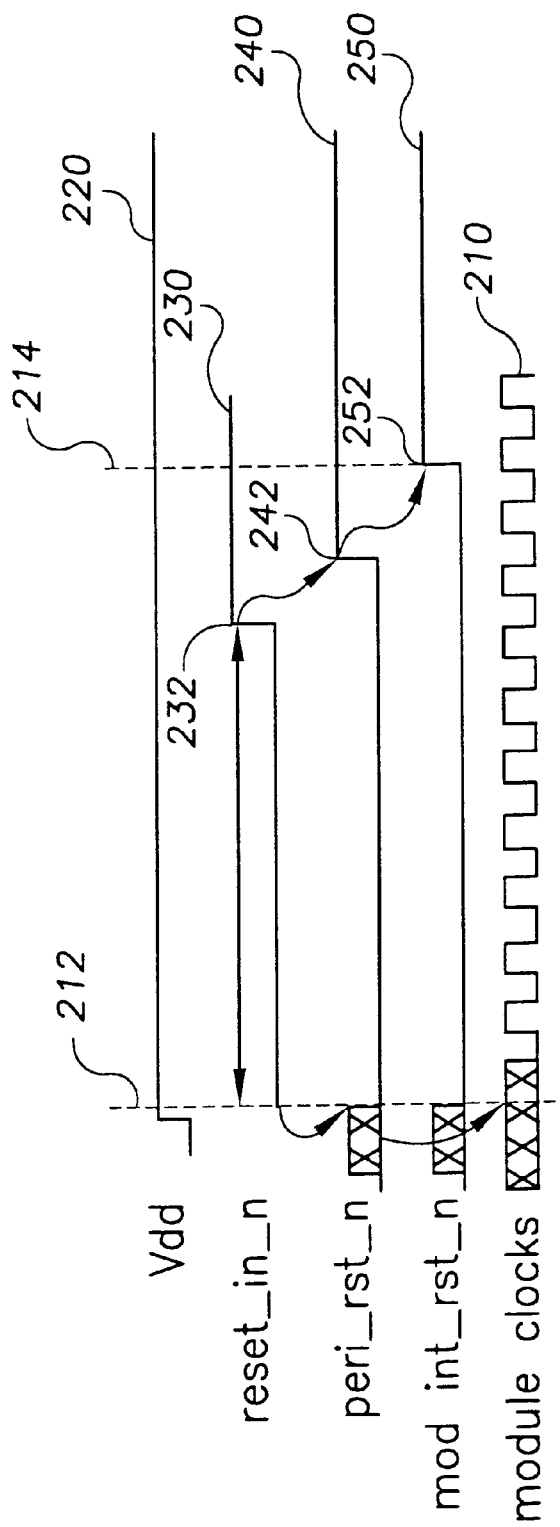
FIG. 2 is a timing diagram for a circuit reset, according to another example embodiment of the present invention.

The timing of the clock module and the reset at the circuit modules may be effected in a variety of manners. FIG. 2 shows a timing diagram for an electronic system, according to another example embodiment of the present invention. Module clock cycles are shown as curve 210, and at clock cycle 212, power Vdd (curve 220) is applied to the system. An external reset input, reset_in_n, is asserted, shown at curve 230, and held for 1 ms. The reset input causes assertion of a peripheral reset, peri_rst_n, to the clock module and the circuit modules, shown as curve 240. When peri_rst_n is asserted, the clock module enables an external clock on module clock outputs to the circuit modules, or peripheral devices. The external clock is used to apply a synchronized internal reset, mod int_rst_n, at each circuit module, shown by curve 250, using the peri_rst_n signal and the external clock signal. When the reset_in_n signal is de-asserted at node 232, the peri_rst_n signal is subsequently de-asserted after one clock cycle at node 242. All circuit modules release their internal resets synchronously, or nearly simultaneously, at node 252, which improves the ability to effect a safe transfer to system boot. The external clock remains asserted for a selected period, and the clock module then switches to a functional clock for each module after the reset has been released. The functional clock may, for example, include a clock signal having a particular frequency and phase related to requirements at each circuit module and overall system timing constraints.

In one implementation, the selected period for which the external clock is asserted is effected via a register in the clock module that is programmed to hold the external clock for a number of clock cycles. When the reset_in_n signal is de-asserted, software in the register operates to switch the clocks from the reference clock to the functional clocks for each circuit module. The switch is effected after a number of clock cycles that allows the internal resets to be released before the switch is made. In a more particular implementation, the internal reset at each circuit module is released two clock cycles after peri_rst_n is de-asserted. In this instance, the software uses at least two clock cycles to switch from the reference clock to the functional clocks, and ensures that the internal resets are synchronously released using the external clock reference.

Figure 3:
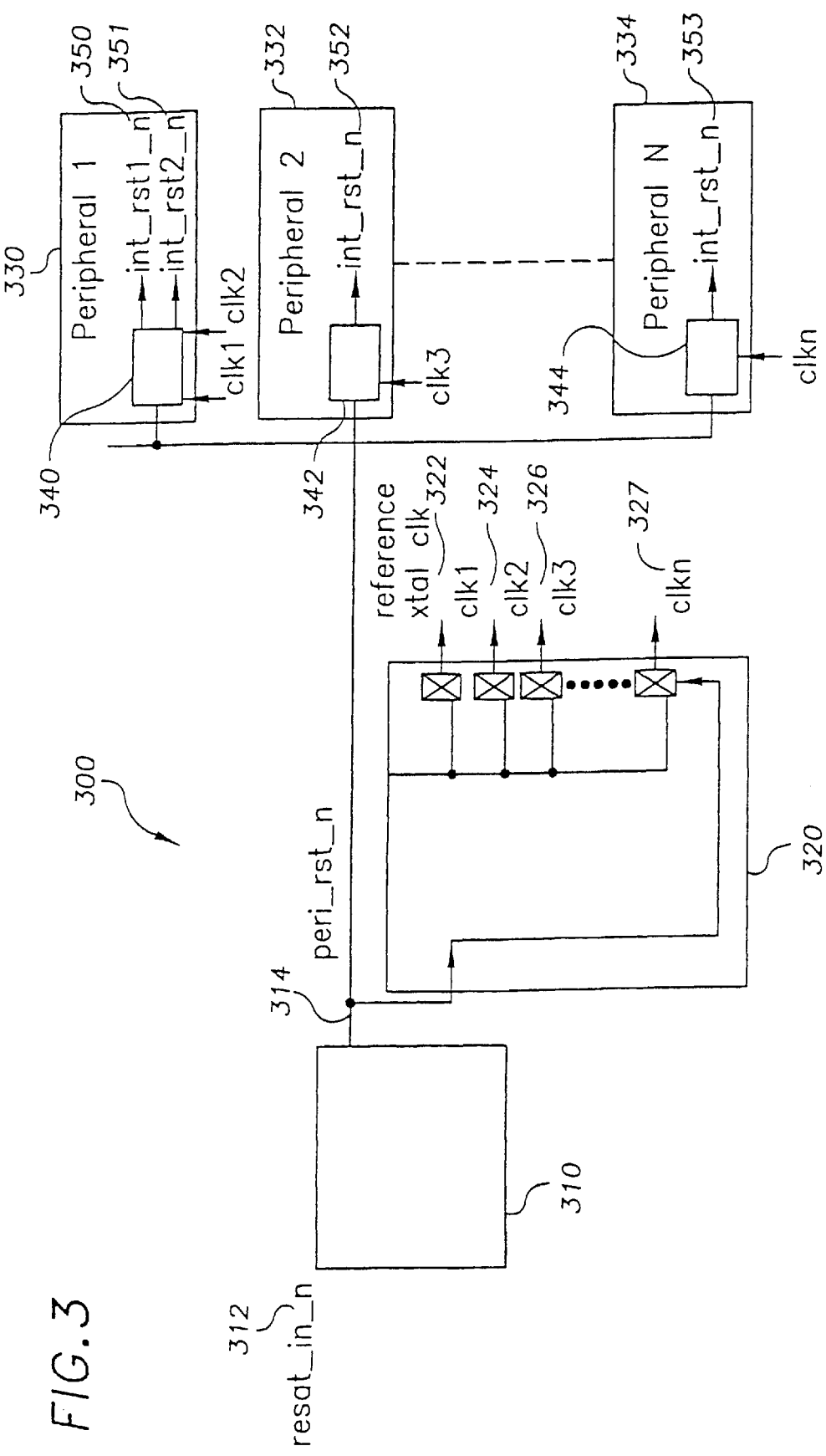
FIG. 3 is a reset circuit, according to another example embodiment of the present invention.

The reset can be effected using a variety of reset circuit arrangements. FIG. 3 shows one such circuit arrangement 300, according to another example embodiment of the present invention. The circuit arrangement includes a reset module comprising reset signal generator 310 that is adapted to send a reset signal 314 to a clock module 320 and to circuit modules comprising peripheral device 1 (item 330), peripheral device 2 (item 332) and peripheral device N (item 334) in response to an input signal 312. The clock module 320 includes clock outputs clk1 (item 322), clk2 (item 324), clk3 (item 326) and clkn (item 327) adapted to send a clock signal to each of the peripheral devices. In addition, although FIG. 3 shows three peripheral devices and four clock outputs, the system 300 is adaptable to accommodate additional peripheral devices up to an "N" number of devices, as well as clock outputs for each of the peripheral devices, as indicated by dashed lines.

Each of the peripheral devices 330, 332 and 334 include synchronization modules 340, 342 and 344, respectively, each having at least one input port adapted to receive the clock outputs, and an input port adapted to receive the reset signal 314. Synchronization module 340 receives clock output clk1 and clk2; module 342 receives clock output clk3 and module 344 receives clock output clkn. The synchronization modules use the clock outputs and the reset signal to generate internal reset signals 350, 351, 352 and 353. Each internal reset signal is synchronized such that each peripheral device is reset using the same clock input, and thus, each device is released from reset nearly simultaneously when the reset is disabled.

Figure 4A:
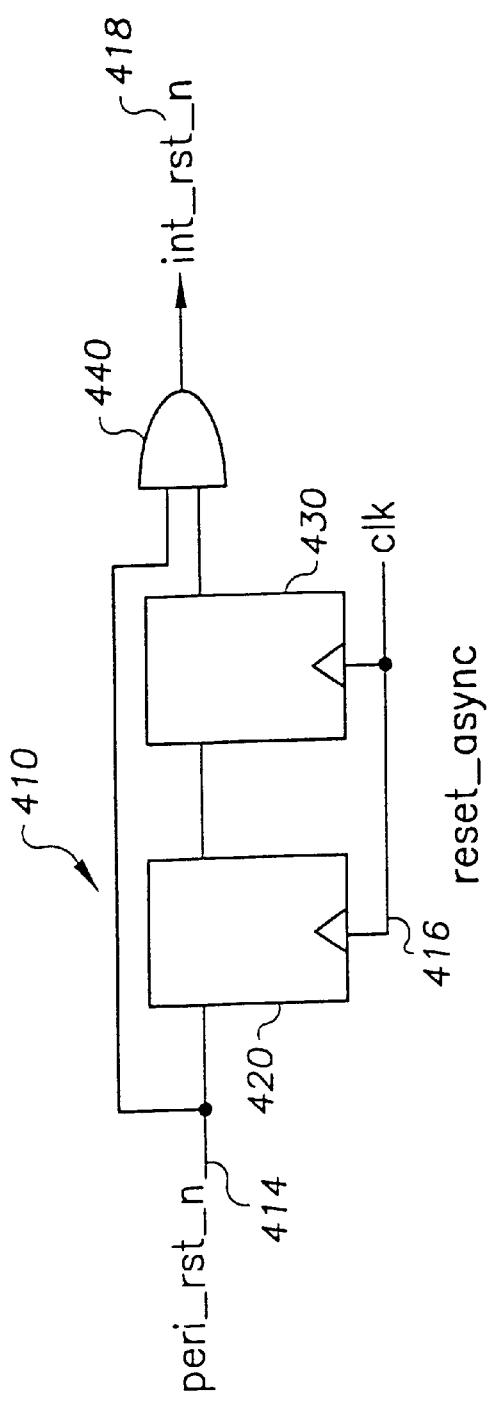
FIG. 4A is an asynchronous reset module, according to another example embodiment of the present invention.
Figure 4B:
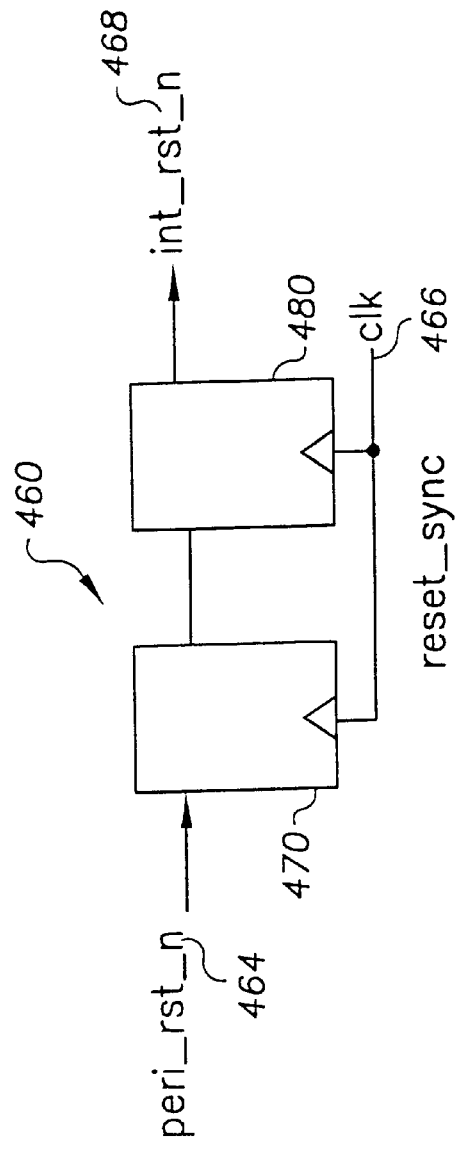
FIG. 4B is a synchronous reset module, according to another example embodiment of the present invention.

The reset circuit and method described herein are applicable to a variety of peripheral devices, each having different reset strategies. FIG. 4A and FIG. 4B show example synchronizers adapted to be used in connection with a reset circuit, such as that described in connection with FIG. 3, according to another example embodiment of the present invention. The synchronizer 410 in FIG. 4A is adapted to generate a reset signal asynchronously, and the synchronizer 460 in FIG. 4B is adapted to generate a reset signal synchronously. Both devices are adapted to effect synchronous de-assertion of a reset at a peripheral device.

Referring to FIG. 4A, reset input signal 414 is received at flip-flop 420 and at AND gate 440. A clock signal 416 cycles the flip-flop 420 and the reset input signal is provided to flip-flop 430. The clock signal 416 cycles flip-flop 430, and the reset input signal from the flip-flop is provided to AND gate 440, which in turn provides an internal reset signal 418 to the peripheral device for which the synchronizer is used.

In FIG. 4B, synchronizer 460 receives a reset input signal 464 at flip-flop 470, which cycles according to a clock signal 466. When the flip-flop 470 is cycled, the reset signal is provided to flip-flop 480, which is also responsive to the clock signal 466. Flip-flop 480 is cycled and provides an internal reset signal 468 to the peripheral device for which the synchronizer is used.

While the present invention has been described with reference to several particular example embodiments, those skilled in the art will recognize that many changes may be made thereto. For example, testing circuitry and logic may be added to various components, such as the synchronization modules. These and other modifications and/or additions may be made without departing from the spirit and scope of the present invention, which is set forth in the following claims.

What is claimed is:

1. A reset circuit adapted to reset a plurality of circuit modules, the circuit modules being adapted to enable internal resets in response to a reset signal, the reset circuit comprising:
   a reset module adapted to generate the reset signal;
   a clock module having an external clock reference and at least one clock module output for each of the plurality of circuit modules, the clock module being adapted to provide a reset clock signal to each of the circuit modules via the clock module outputs in response to the generated reset signal, the reset clock signal having the frequency of the external clock reference; and
   a plurality of synchronization modules, each coupled to one of the plurality of circuit modules and having a reset input port coupled to the reset module and a clock input port coupled to one of the clock module outputs and being adapted to use the reset signal and the reset clock signal to provide an internal reset signal at the circuit module to which it is coupled, each of the internal reset signals being synchronized via the reset clock signal.

2. The reset circuit of claim 1, wherein the synchronization modules are adapted to simultaneously release the internal reset signal in response to the reset signal being de-asserted.

3. The reset circuit of claim 2, wherein the clock module includes a register adapted to disable the reset clock signal at a programmed number of clock cycles after the reset signal is de-asserted and to switch the clock module outputs to a functional clock signal for each circuit module.

4. The reset circuit of claim 1, wherein the reset module generates the reset signal in response to a reset input signal to the reset module.

5. The reset circuit of claim 1, wherein the synchronization modules are adapted to hold the internal reset for a predetermined amount of clock cycles and disable the internal reset after the predetermined amount of clock cycles has passed in response to the reset signal being de-asserted.

6. The reset circuit of claim 5, wherein the synchronization modules include at least one flip-flop adapted to hold the internal reset signal for one clock cycle after the reset signal is de-asserted.

7. The reset circuit of claim 1, wherein the plurality of circuit modules includes a first circuit module requiring an asynchronous reset signal to effect a reset and a second circuit module requiring a synchronous reset signal to effect a reset.

8. The reset circuit of claim 1, wherein the reset module is adapted to generate the reset signal in response to a system power-up signal and to hold the reset signal for a selected time period before powering-up the circuit modules.

9. The reset circuit of claim 1, wherein the external clock reference is the only clock reference used to reset the circuit modules.

10. The reset circuit of claim 1, further comprising a functional module clock adapted to provide a functional clock signal to a portion of the circuit module while the reset clock signal is being applied to the circuit module.

11. The reset circuit of claim 1, wherein the synchronization modules are programmed with test logic adapted for testing the operation of the circuit modules.

12. The reset circuit of claim 1, wherein at least one of the synchronization modules includes first and second flip flops coupled to the clock module outputs, the first flip-flop being coupled to the reset input port and the second flip-flop being coupled to an output of the first flip-flop, wherein an output of the second flip-flop is used as the internal reset signal at the circuit module to which the synchronization module is coupled.

13. The reset circuit of claim 1, wherein at least one of the synchronization modules includes an AND gate and first and second flip flops coupled to the clock module outputs, the first flip-flop being coupled to the reset input port and the second flip-flop being coupled to an output of the first flip-flop, the AND gate being coupled to the reset input port and to an output of the second flip-flop, an output of the AND gate being used as the internal reset signal at the circuit module to which the synchronization module is coupled.

14. A reset circuit adapted to reset a plurality of circuit modules adapted to enable internal resets in response to a reset signal, the reset circuit comprising:
   means for generating a reset signal;
   means for providing a reset clock signal to each of the circuit modules in response to the generated reset signal, the reset clock signal having the frequency of an external clock reference; and
   means for using the reset signal and the reset clock signal to provide an internal reset signal at the circuit module to which it is coupled, each of the internal reset signals being synchronized via the reset clock signal.

15. A method for resetting a plurality of circuit modules adapted to enable internal resets in response to a reset signal, the method comprising:
   generating a reset signal;
   providing a reset clock signal to each of the circuit modules in response to the generated reset signal, the reset clock signal having the frequency of an external clock reference; and
   using the reset signal and the reset clock signal to provide an internal reset signal at the circuit module to which it is coupled, each of the internal reset signals being synchronized via the reset clock signal.

16. The method of claim 15, wherein generating a reset signal includes generating the reset signal in response to a system power-up signal.

17. The method of claim 15, wherein providing a reset clock signal includes holding the reset for a predetermined amount of clock cycles and de-asserting the reset after the predetermined amount of clock cycles has passed.

18. The method of claim 17, further comprising simultaneously releasing the internal reset signals at the circuit modules in response to the de-assertion of the reset signal.

19. The method of claim 17, further comprising enabling a functional clock signal to the circuit modules at a programmed number of clock cycles after the reset signal is de-asserted.

20. The method of claim 15, wherein the plurality of circuit modules includes a first circuit module requiring an asynchronous reset signal to effect a reset and a second circuit module requiring a synchronous reset signal to effect a reset, wherein using the synchronized reset signal to reset each circuit module includes simultaneously disabling reset signal at the first and second circuit modules.

* * * * *